United States Patent [19]

Fuller et al.

[11] Patent Number: 5,266,438
[45] Date of Patent: Nov. 30, 1993

[54] TONER POLYMERS AND PROCESSES THEREOF

[75] Inventors: Timothy J. Fuller, Henrietta; Anita C. VanLaeken, Macedon; William M. Prest, Jr., Webster, all of N.Y.

[73] Assignee: Xerox Corporation, Stamford, Conn.

[21] Appl. No.: 843,026

[22] Filed: Feb. 28, 1992

[51] Int. Cl.$^5$ .............................. G03G 9/087
[52] U.S. Cl. .................... 430/137; 430/109
[58] Field of Search .............. 430/109, 106, 137

[56] References Cited

U.S. PATENT DOCUMENTS

| | | | |
|---|---|---|---|
| 4,217,406 | 8/1980 | Tanaka et al. | 430/137 |
| 4,469,770 | 9/1984 | Nelson | 430/110 |
| 4,560,635 | 12/1985 | Hoffend et al. | 430/106.6 |
| 4,617,249 | 10/1986 | Ober et al. | 430/137 |
| 4,824,750 | 4/1989 | Mahalek et al. | 430/99 |
| 4,894,309 | 1/1990 | Georges et al. | 430/137 |
| 4,952,477 | 8/1990 | Fuller et al. | 430/109 |
| 4,954,408 | 9/1990 | Georges | 430/108 |
| 5,147,753 | 9/1992 | Hikake | 430/137 |

*Primary Examiner*—John Goodrow
*Attorney, Agent, or Firm*—E. O. Palazzo

[57] ABSTRACT

A process for the preparation of crosslinked styrene-1,2-butadiene copolymers which comprises reacting by heating in an extruder a low molecular weight styrene-1,2-butadiene copolymer with a $M_n$ between 2,500 and 45,000 and a crosslinking component; thereafter cooling and isolating the product.

15 Claims, No Drawings

TONER POLYMERS AND PROCESSES THEREOF

BACKGROUND OF THE INVENTION

This invention is generally directed to toner compositions, and more specifically, the present invention relates to toner polymers with low fuser set temperature and broad fusing latitude obtained by the crosslinking of low molecular weight copolymers like styrene-1,2-butadiene copolymers. In one embodiment, the present invention is directed to toner polymers prepared by the crosslinking of styrene-1,2-butadiene copolymers in an extruder, and the preparation of toners thereof, and wherein the toner characteristics may be modified by the addition of certain components like hexafluoroacetone. More specifically, in one embodiment of the present invention there are provided developer compositions formulated by admixing toner compositions containing the toner polymeric resins prepared as illustrated herein, and carrier components. In one specific embodiment of the present invention, there are provided toner compositions with copolymers prepared by extrusion, which polymers are nontoxic, nonblocking at temperatures of less than 50° C., for example, easily jettable, melt fusable with a broad fusing temperature latitude, cohesive above the melting point of the resin, and triboelectrically chargeable. Moreover, in addition the toner compositions of the present invention possess low fusing temperatures, and therefore, lower fusing energies are required for fixing enabling less power consumption during fusing, and permitting extended lifetimes for the fuser systems selected. Accordingly, the toners of the present invention can be fused (fuser roll set temperature) at temperatures of 260° F. or less as compared to many currently commercially available toners which fuse at temperatures of from about 300° to about 325° F. With further respect to the present invention, the extrusion prepared polymers selected have a $T_{g\text{-}mid}$ of from between about 26° to about 60° C., and preferably from about 40° to about 58° C. as determined by DSC and by other known methods. Also, the toner and developer compositions of the present invention are particularly useful in electrophotographic imaging and printing systems, especially xerographic imaging processes.

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles or conductive toner compositions are selected depending on the development systems used. Moreover, of importance with respect to the aforementioned developer compositions is the appropriate triboelectric charging values associated therewith as it is these values that enable continued constant developed images of high quality and excellent resolution; and admixing characteristics. Specifically, thus toner and developer compositions are known, wherein there are selected as the toner resin styrene acrylates, styrene methacrylates, and certain styrene-1,4-butadienes, including those available as PLIOLITES ®. Other resins, including certain crosslinked resins, U.S. Pat. No. Re. 31,072, and polyesters as illustrated in U.S. Pat. No. 3,590,000 have also been selected for incorporation into toner compositions. Moreover, it is known that single component magnetic toners can be formulated with styrene-1,4-butadiene resins, particularly those resins available as PLIOLITE ®. In addition, positively charged toner compositions containing various resins inclusive of certain styrene-1,4-butadienes and charge enhancing additives are known. For example, there are described in U.S. Pat. No. 4,560,635, the disclosure of which is totally incorporated herein by reference, positively charged toner compositions with distearyl dimethyl ammonium methyl sulfate charge enhancing additives. This '635 patent also illustrates the utilization of suspension polymerized styrene-1,4-butadienes for incorporation into toner compositions, reference for example working Example IX.

Numerous patents are in existance that illustrate toner compositions with various types of toner resins including, for example, U.S. Pat. Nos. 4,104,066, polycaprolactones; 3,547,822, polyesters; 4,049,447, polyesters; 4,007,293, polyvinyl pyridine-polyurethane; 3,967,962, polyhexamethylene sebaccate; 4,314,931, polymethyl methacrylate; U.S. Pat. No. 25,136, polystyrenes; and U.S. Pat. No. 4,469,770, styrene-1,4-butadiene copolymers.

Disclosed in U.S. Pat. No. 4,529,680 are magnetic toners for pressure fixation containing methyl-1-pentene as the main component. More specifically, there are illustrated in this patent, reference column 2, beginning at line 66, magnetic toners with polymers containing essentially methyl-1-pentene as the main component, which polymer may be a homopolymer or copolymer with other alpha-olefin components. It is also indicated in column 3, beginning at around line 14, that the intrinsic viscosity of the polymer is of a specific range, and further that the melting point of the polymer is in a range of 150° to 240° C., and preferably 180° to 230° C.

Additionally, there are specifically illustrated in U.S. Pat. No. 4,558,108 toner compositions with suspension polymerized styrene-1,4-butadienes, aforementioned resins, pigment particles, and charge enhancing additives.

In addition, several recently issued patents illustrate toner resins including vinyl polymers, diolefins, and the like, reference for example U.S. Pat. No. 4,560,635. Moreover, there are illustrated in U.S. Pat. No. 4,469,770 toner and developer compositions wherein there are incorporated into the toner styrene-1,4-butadiene resins prepared by emulsion polymerization processes.

Illustrated in U.S. Pat. No. 4,952,477 (Aug. 28, 1990) are low melting toners with semicrystalline resins, and more specifically, as toner resins semicrystalline polyolefin polymers with a melting point of from about 50° to about 100° C., and preferably from about 60° to about 80° C. of, for example, the following formulas wherein X is a number of from about 250 to about 21,000; the number average molecular weight is from about 17,500 to about 1,500,000 as determined by GPC and the $M_w/M_n$ dispersity ratio is from about 2 to about 15.

I. Polypentenes-$(C_5H_{10})_x$

II. Polytetradecene-$(C_{14}H_{28})_x$.

In a patentability search report, the following United States patents are recited: U.S. Pat. No. 4,217,406, which relates to a process for the preparation of toner compositions by melt-kneading a crosslinkable functional group containing resin and a colorant with a polyfunctional resin capable of reacting with the crosslinkable group containing resin, or a low molecular weight crosslinking agent, and wherein acrylic copolymer with styrene and polyester resins are selected; U.S. Pat. No. 4,824,750, which relates to a toner comprised of certain crosslinked styrene copolymers with an insoluble gel content of from about 20 to about 60 percent; and as background interest U.S. Pat. Nos. 3,941,898; 4,617,249; 4,894,309 and 4,954,408. This prior art appears to be specific to acrylates and polyesters, which are activated to crosslinking by addition and condensation reactions generally accomplished during copolymerization reactions.

While investigating crosslinking reactions with styrene-butadiene copolymers subsequent to polymerization it was found that the stereo-chemistry of butadiene incorporation in the copolymer is crucial to the formation of crosslinks and to improved toner properties. In general, polymerized 1,2-butadienyl groups are activated to crosslinking, whereas polymerized 1,4-butadienyl groups are inactive to crosslinking unless drastic reaction conditions are used, typically greater than 200° C.

U.S. Pat. Nos. 3,941,898 and 4,824,750 relate to the preparation of crosslinked toner resins obtained by crosslinking the resin during the polymerization reaction by inclusion of suitable difunctional monomeric and oligomeric crosslinking agents. Suitable crosslinking agents include aromatic divinyl compounds, diacids, and diacrylates. The methods taught are applicable to polyacrylates and polyesters. Butadiene and butadiene containing polymers do not appear to be mentioned in, for example, the lengthy lists of acceptable vinyl and divinyl containing materials suited to the patent's teachings, including most commonly, divinyl benzene.

U.S. Pat. No. 4,217,406 relates to a process for preparing crosslinked toner by melt kneading a reactive resin with a suitable crosslinking agent, usually a multifunctional oligomer. The teachings are specific to acrylic copolymers and polyester resins with butadiene and butadiene containing polymers being absent from a lengthy list of acceptable reactive monomers, multifunctional monomers and oligomers suitable as crosslinking agents.

One explanation for the omission of butadiene, and specifically, styrene-butadiene copolymers in the teachings of U.S. Pat. Nos. 4,217,406 and 3,941,898 is that styrene-1,4-(cis- and trans-)butadiene copolymers readily available from the free radical copolymerization of styrene with butadiene are not readily crosslinked under the melt or copolymerization reaction conditions described. We have not been able to crosslink styrene-1,4-butadiene copolymers with benzoyl peroxide under mild melt mixing conditions used to prepare toners, for example 150° C., for 30 minutes using a Brabender melt mixer. Moreover, soluble, uncrosslinked styrene-1,4-butadiene copolymers are the chief product obtained when styrene and butadiene copolymers are copolymerized with free radical catalysts. Clearly, butadiene is not acting as a difunctional crosslinking agent under these conditions and the olefinic double bonds produced are not reactive towards radicals generated by benzoyl peroxide and the like. When either acrylate or ester difunctional crosslinking agents are used with styrene-1,4-butadiene copolymers, homopolymerization of polyacrylates or polyesters are preferred. Moreover, reactivity ratios prominently disfavor crosslinking and co-reaction of esters and acrylates with styrene-1,4-butadiene copolymers under conditions taught in U.S. Pat. No. 3,941,898. Consequently, styrene-butadiene resins do not appear to be interchangeable with acrylate and ester resins.

U.S. Pat. No. 4,824,750 relates to toners with fusible, crosslinked binder polymer. A list of suitable crosslinking compounds begins at line 62, page 7, of the '750 patent, and a lengthy list of acceptable materials excludes butadiene and butadiene-containing copolymers. However, Table 1, part E, on pages 11 and 12, lists an ethylenic unsaturation site such as butadiene, for example, poly(styrene-co-methyl methacrylate-co-ethylhexyl methacrylate-co-butadiene) along with E-1, a curing agent consisting of elemental sulfur admixed with a sulfur containing compound such as mercaptobenzothiazole. This polymer incorporates butadiene as the 1,4-regio-stereo-isomer, and the curing agent described is similar to one used for the vulcanization of tire rubber made with poly-cis and trans-1,4-butadiene. The curing conditions required are much more severe than those typically used to process toners. Moreover, the examples cited in the '750 patent are specific to polyacrylate and polyester resins in which crosslinking takes place during copolymer preparation and not subsequently after the polymer had been made. The reaction conditions and peroxide used in the preparation of the resin are inadequate to crosslink the resin, otherwise crosslinking of the olefinic groups would occur during the copolymerization reaction and would lead to polymer insolubility and resistance to flow with heat.

Surprisingly, it has been determined that styrene-1,2-vinylbutadiene copolymers prepared by anionic copolymerization can subsequently be crosslinked with heat (>140° C.) and with free radicals (thermally generated from benzoyl peroxide and azobisisobutyronitrile) using a melt mixing apparatus in the absence of difunctional crosslinking agents. This result is contrary to that obtained with styrene-1,4-(cis-and trans-)butadiene copolymers which are stable to heat and peroxides. Apparently the 1,2-vinyl-butadienyl is more active than the cis- and trans-1,4-butadienyl conformer towards crosslinking reactions. The presence of a suitable crosslinking agent such as a difunctional monomer or oligomer is unnecessary because the 1,2-vinyl groups undergo addition and combination reactions with each other. Thus, the crosslinking reaction is simplified, and polymer homogeneity in the crosslinked product is not affected. One explanation why the crosslinkable, styrene-1,2-vinylbutadiene copolymers have not been reported is because these resins are unique to the anionic polymerization process and heretofore have not been commercially available.

Although the above described toner compositions and resins in prior art patents are suitable for their intended purposes, in most instances there continues to be a need for toner and developer compositions containing new resins, especially toner resins suited to black and color prints and transparencies. More specifically, there is a need for toners which can be fused at lower energies than many of the presently available resins selected for toners. There is also a need for resins that can be selected for toner compositions which are of low cost, nontoxic, nonblocking at temperatures of less than 50° C., jettable, melt fusible with a broad fusing latitude, cohesive above the melting temperature, and triboelectrically chargeable. In addition, there remains a need for toner compositions which can be fused at low temperatures, that is for example 25° C. (50° F.) or less, as compared to those presently in commercial use which require fusing temperatures of 300° to 325° F., thereby enabling with the compositions of the present invention the utilization of lower fusing temperatures, and lower fusing energies permitting less power consumption during fusing, and allowing the fuser system particularly the fuser roll selected, to possess extended lifetimes. Another need resides in the provision of developer compositions comprised of the toner compositions illustrated herein, and carrier particles. There also remains a need for toner and developer compositions containing additives therein, for example charge enhancing components, thereby providing positively or negatively charged toner compositions. Furthermore, there is a need for toner and developer compositions with polymers prepared by reactive extrusion methods, reference copending application U.S. Ser. No. 07/814,641 and U.S. Pat. No. 5,227,460, the disclosures of which are totally incorporated herein by reference, that will enable the generation of solid image area with substantially no background deposits, and full gray scale production of half tone images in electrophotographic systems.

There is also a need for novel polymers, and mixtures of the aforementioned polymers and with $T_{g\text{-}mid}$ of from about 26° to about 60° C., and preferably from about 40° to about 58° C., and wherein toner compositions containing the aforementioned resins can be formulated into developer compositions which are useful in electrophotographic imaging and printing systems, and wherein fusing can, for example, be accomplished by heated rolls, flash, radiant with heated ovens, and cold pressure fixing methods.

SUMMARY OF THE INVENTION

It is an object of the present invention to provide toner and developer compositions which possess many of the advantages illustrated herein.

In another object of the present invention there are provided toner polymers with low fuser set temperatures between 220° and 300° F., and broad fusing latitude between 20° and 50° C. obtained, for example, by the crosslinking of low molecular weight polymers with $M_n$ between 2,500 and 45,000.

Also, in another object of the present invention there are provided processes for toner compositions containing therein polymers obtained by reactive extrusion as resinous components, which components have $T_{g\text{-}mid}$ of from about 26° to about 60° C., and preferably from about 40° to about 58° C.

Further, in an additional object of the present invention there are provided developer compositions comprised of toners having incorporated therein polymers obtained with the processes illustrated herein, and carrier particles.

Furthermore, in another object of the present invention there are provided processes for improved toner compositions which can be fused at lower temperatures thereby reducing the amount of energy needed for effecting fusing of the image developed.

Moreover, in another object of the present invention there are provided developers with positively or negatively charged toner compositions that possess excellent electrical properties.

Also, in another object of the present invention there are provided developers with stable triboelectric charging characteristics for extended time periods exceeding, for example, 300,000 imaging cycles.

Another object of the present invention resides in the provision of toner compositions with excellent blocking temperatures, and acceptable fusing temperature latitudes.

In another object of the present invention there are provided toner and developer compositions that are of low cost, nontoxic, nonblocking at temperatures of less than 50° C., jettable, melt fusible with a broad fusing latitude, and cohesive above the melting temperature thereof.

Furthermore, in an additional object of the present invention there are provided developer compositions containing carrier particles with a coating thereover consisting of a mixture of polymers that are not in close proximity in the triboelectric series, reference U.S. Pat. Nos. 4,937,166 and 4,935,326 the disclosures of which are totally incorporated herein by reference.

Also, in yet still another object of the present invention there are provided methods for the development of electrostatic latent images with low melting toner compositions.

Furthermore, in yet a further object of the present invention there are provided developer compositions and processes thereof with carrier particles comprised of a coating with a mixture of polymers that are not in close proximity, that is for example, a mixture of polymers from different positions in the triboelectric series, and wherein the low toner compositions incorporated therein possess excellent admix charging values of, for example, less than one minute, and triboelectric charges thereon of from about 15 to about 35 microcoulombs per gram.

Another object of the present invention resides in the provision of processes for toner and developer compositions, which are insensitive to humidity of from about 20 to about 80 percent, and which compositions possess superior aging characteristics enabling their utilization for a substantial number of imaging cycles with very stable triboelectrical properties.

Also, in another object of the present invention there are provided low melting toner compositions.

In still another object of the present invention there are provided toner and developer compositions for effecting development of images in electrophotographic imaging apparatus, including xerographic imaging and printing processes.

These and other objects of the present invention are accomplished by providing toner and developer compositions containing therein certain polymer resins. More specifically, in one embodiment of the present invention there are provided processes for toner compositions comprised of pigment particles, and certain polymers, especially anionic polymerized styrene-1,2-butadiene copolymers of low molecular weight which can be heat modified or crosslinked by reactive extrusion, and which polymers can have a $T_{g\text{-}mid}$ of from about 26° to about 60° C. and preferably from about 40° to about 58° C. as determined by DSC.

More specifically, the heat modified or crosslinked polymers with a $T_{g\text{-}mid}$ of from about 26° to about 60° C., and preferably from about 40° to about 58° C. selected for the toner compositions and processes of the present invention include styrene-butadiene copolymers with between 60 and 84 weight percent of styrene and between 16 and 40 weight percent of butadiene with between 5 and 100 percent of the butadiene content as 1,2-vinyl regioisomer, as determined by $^1$H NMR spectrometry. The preferable 1,2-vinyl content in embodiments is 85+/−5 percent.

The toner polymers of the present invention can be prepared by the reactive extrusion of low molecular weight unsaturated polymers like styrene-1,2-butadiene copolymers with number average molecular weight ($M_n$) between 2,500 and 45,000 as determined by gel permeation chromatography, with oxidizing agents like peroxides by heating at an effective temperature of, for example, from between about 100° to about 130° C., and without peroxides by heating at a temperature of from between about 140° to about 200° C.

Toner polymers with low fuser set temperature and broad fusing latitude can be obtained by the crosslinking of low molecular weight styrene-butadiene copolymers, especially those made by anionic polymerization containing pendant 1,2-vinyl butadiene groups which are more activated to dissociation, recombination, and crosslinking compared with internal cis and trans butadiene regioisomers. Crosslinking takes place in an extruder at greater than 110° C. with azo or peroxide catalysts and at greater than 140° C. without added free radical crosslinking agents. The physical properties of some of the anionic copolymers useful as starting materials for crosslinking and heat modification reactions include those summarized in Table 1. The copolymers in Table 1 were prepared in cyclohexane and tetrahydrofuran, the latter reagent functions as a solvent for the lithium/naphthalene initiator and as polar activator for the 1,2-vinyl enchainment of butadiene in the copolymers. The copolymers in Table 1 have $T_{g\text{-}mid}$ values between 48.7° and 54.3° C., and $M_n$ between 2,500 and 81,700. Advantages to the controlled crosslinking of materials like those in Table 1 (by controlled addition of crosslinking agents) include broader fusing latitudes compared with the starting resin with only a slight increase in minimum fix temperature. It is believed that the fusing enhancements originate from the improvement of resin integrity (mechanical properties) on crosslinking due to increased weight average molecular weight, while the glass transition temperature of heat-treated copolymer remains nearly the same as the untreated material.

Moreover, the presence of crosslinked gel may be responsible for some of the improved performance in fusing latitude with these treated resins. The crosslinking of some of the materials listed in Table 1 was accomplished by melt reaction processing, that is extrusion with peroxide catalyst at between 110° and 130° C. or without peroxides at greater than 140° C. Although mixing extruders are suitable apparatus for carrying out the melt reactions, Banbury mixers, rubber roll mills, and a pastorecorder (plastograh designed by Brabender or Haake) are also suitable melt mixing apparatus. Crosslinking presumably takes place by addition reactions between 1,2-vinyl double bonds. The degree of branching or crosslinking can be controlled using appropriate concentrations of known crosslinking agents like peroxides, bis-azo-compounds, and the like, present between 0.1 and 10 weight percent and preferably 1 weight percent at between 110° and 130° C., or by using higher temperatures (greater than 140° C.) in the absence of peroxides and suitable crosslinking agents. Reaction times vary between 1 and 30 minutes. By controlled crosslinking, appropriate fusing latitude is achieved without dramatic sacrifice in minimum fix temperature. Some insoluble gel forms, which are difficult to characterize, however, the gel improves the toughness and physical properties of the polymer. The glass transition temperature sometimes changed by 2° C. after heat treatment.

The process of the present invention, for example, comprises (1) mixing powdered anionic styrene-1,2-butadiene copolymer (50 grams) with between 0.1 and 10 weight percent and preferably 1 weight percent benzoyl peroxide using a coffee grinder as a laboratory mill (400 milliliters capacity); (2) heating the peroxide-copolymer mixture for between 1 and 30 minutes and usually 20 minutes in a Brabender plastorecorder mixing apparatus at 130° C.; (3) allowing the molten mass to cool to 25° C.; (4) chipping away the polymeric solid from the mixing apparatus using a knife; (5) chopping the polymer using a coffee grinder lab mill or Waring blender; (6) formulating the resulting powder with carbon black or colorant and charge control agent, usually 6 weight percent of REGAL 330 ® carbon black and 2 weight percent of cetyl pyridium chloride using a coffee grinder; (7) extruding the mixture at 130° C. using a CSI mixing extruder; (8) chopping the extrudate using a coffee grinder or lab mill; (9) jetting the chopped extrudate with a Trost jet mill; (10) classifying the resultant particles to 10 microns using a Donaldson classifier; and (11) mixing the resulting toner with carrier to form developer.

The crosslinked resin has a gel content that is usually less than 30 percent, and typically from about 1 to about 25 percent in embodiments. Gel content was inferred by dissolving the crosslinked copolymer in methylene chloride, filtering the mixture, removing the solvent from the filtrate, and weighing the soluble polymeric residue that remained. Crosslinking usually by definition means that the copolymer is insoluble in common organic solvents such as methylene chloride, toluene, cyclohexane, and tetrahydrofuran.

Crosslinked polymers have a gel component which can be difficult to analyze, but which can profoundly influence the fusing properties of the resultant toner, especially with respect to enhanced fusing latitude. As the gel is insoluble, analysis by gel permeation chromatography (GPC) is usually constrained to the low molecular weight soluble component of the heat modified, crosslinked polymers. Light scattering measurements may be more accurate in some instances than GPC for gel analysis.

In a typical example, a styrene-1,2-butadiene copolymer with a molecular weight average of nearly 9,000 is mixed with 1 weight percent of benzoyl peroxide, and then the mixture is melt-mixed at 130° C. in a plastorecorder melt mixing apparatus (Brabender) for 20 minutes. The resultant crosslinked resin was then allowed to air cool, then was chipped away from the mixing apparatus using a knife and hammer, then chopped using a lab mill, and was then extruded at 130° C. with 6 weight percent of REGAL 330 ® carbon black, and 2 weight percent of cetyl pyridinium chloride using a CSI mixing extruder. The resultant extrudate was ground up using a lab mill and then micronized to 9 microns using a Trost jet mill. After classification with a Donaldson classifier to 9 microns as determined by Laysen cell particle analysis, the resultant toner had a fusing latitude that was 29° F. greater than that of a toner prepared with the starting uncrosslinked resin using the same composition and process conditions. The $T_{g\text{-}mid}$ of the resultant toner prepared by the aforementioned process of the present invention was 50° C.

An effective melt mixing time is selected such as greater than 1 minute and is usually most practically less than 30 minutes, that is, from about 1 to about 29 minutes in embodiments. The amount of crosslinking which is usually between 1 and 30 percent is controlled for example by the amount of crosslinking agent, such as benzoyl peroxide added to the resin at between 1 and 10 weight percent, processing temperature, usually between 100° and 150° C., and rigor of mixing (shear and torque). The torque measured using the Brabender mixer is usually between 30 and 100 gauge units (measured in foot-pounds). Without peroxide to assist crosslinking, mixing at >140° C. is required for several minutes, usually 10 minutes, with longer reaction times allowing greater declines in $M_n$ with slightly increased $M_w$. Typical reaction times are between 1 and 30 minutes, and 5 minutes is preferred.

When peroxides or azo-initiators are selected for the processes of the present invention, the crosslinking amount is determined by the number of free radicals formed by the dissociation of these crosslinking agents. By increasing the peroxide concentration from 1 to 5 weight percent, copolymer crosslinking increased from 5 to 25 weight percent, as measured by the method previously described. For toner resins, the optimum amount of peroxide is between 0.1 and 10 weight percent, and about 1 weight percent peroxide per weight of resin is preferred. The optimum processing temperatures range between 110° and 150° C. The amount of mixing (shear) should be minimized, but conventional extrusion conditions are acceptable for most applications. Increased shear for extended periods of time will degrade the polymers to a degree which must be determined empirically.

In embodiments, by controlling the crosslinking with temperature and/or concentration of peroxide, appropriate polymer fusing latitude, namely at least 20° C., is achieved without significant adverse effects on the minimum fix temperature. The minimum fix temperature is dependent on $T_{g\text{-mid}}$. Typical minimum fix temperatures range between 120° and 130° C. for copolymers with $T_{g\text{-mid}}$ values between 50° and 58° C. In one embodiment, a styrene-1,2-butadiene copolymer with a GPC molecular weight average of about 6,000 is physically blended with benzoyl peroxide, 1 weight percent, using a lab mill, and then the polymer is melt mixed above the polymer glass transition temperature at an effective temperature, for example 130° C., in a plastorecorder melt mixing apparatus made by Brabender. The crosslinked polymer is allowed to cool, isolated by chipping away from the melt mixing apparatus with a knife, and is then chopped using a lab mill or a Waring blender. The crosslinked polymer (50 grams, 92 weight percent of the toner formulation) is then compounded with 6 weight percent of REGAL 330 ® and 2 weight percent of cetyl pyridinium chloride. After extrusion at 130° C. using a CSI mixing extruder, the extrudate is ground up using a lab mill, micronized using a Trost jet mill, and then classified to 9 microns using a Donaldson classifier. The resultant toner had a fusing latitude that was 29° F. higher than that of toner made with the original uncrosslinked polymer as determined by fusing studies using a Xerox Corporation 5028 silicone roll fuser operated at 3.3 inches per second.

In embodiments, the process of the present invention comprises mixing a styrene-1,2-butadiene copolymer having active 1,2-vinyl groups with an organic peroxide between 0.1 and 10 weight percent and preferably 1 weight percent, and melt mixing the blend at between 100° and 200° C. and preferably at 130° C. in a suitable melt mixing apparatus such as an extruder, rubber roll mill, Banbury mixer, or a plastorecorder melt mixing apparatus made by Brabender or Haake blender. The resultant crosslinked copolymer is then formulated with colorants and suitable charge control agents, and is then melt processed in an extruder or melt mixing apparatus. The extrudate or the molten compound is allowed to cool, is ground up, micronized and classified to between 9 and 15 microns. The resultant powder is then used as a xerographic developer in single component or two component developer housings for development of electrophotographic images.

Two concerted reactions take place when anionic copolymers are heated in the absence of peroxides. These include chain scission and crosslinking. Both are demonstrated with gel permeation chromatography. Chain scission is evidenced by a decrease of $M_n$ with increased time at elevated processing temperature (greater than 5 to 10 minutes at more than 120° C.). Chain coupling is evidenced by a concomitant increase in $M_w$. For example, a copolymer comprised of 75.5 weight percent of styrene and 24.5 weight percent of butadiene with 84.0 percent of 1,2-vinyl groups was prepared with a $T_{g\text{-mid}}$ of 50° C. and a GPC $M_w/M_n = 33,200/18,771$. After 10 passes through an extruder at 90° C., the $M_w/M_n = 33,740/18,640$ (little change from the original). After 10 passes through an extruder at 120° C., the $M_w/M_n = 33,070/16,480$ ($M_w$ is nearly unchanged, but $M_n$ decreased). After 10 passes through an extruder at 150° C., the $M_w/M_n = 49,010/13,530$ ($M_w$ had increased, while $M_n$ decreased). The $T_{g\text{-mid}}$ increased from 50° to 51.2° C. after heat treatment at 150° C. By comparison, the same resin was heated for 16 hours at 150° C. in an oven. The $M_w/M_n = 75,579/10,614$. These results are compatible with a chain scission/chain coupling mechanism. Thus, heat alone can be used to modify the styrene-butadiene copolymers with active 1,2-vinyl groups provided, for example, that processing temperatures exceed 140° C., for example from 140 to about 190, and preferably such temperature is 150° C.

Moreover, the addition of hexafluoroacetone during the crosslinking step markedly influences the properties of the resin used in the toner formulation. The incorporated hexafluoroacetone imparts toughness and better dye, pigment, or colorant mixing, presumably due to hyroxyl groups introduced to the polymer chain. The preferable concentration of hexafluoroacetone is between 1 and 10 weight percent and preferably near 5 weight percent based on weight of resin.

These copolymers in embodiments consume less energy, that is for example their heats of fusion are dependent on $T_{g\text{-mid}}$. For $T_{g\text{-mid}}$ values between 50° and 58° C., heats of fusion are generally less than 250 Joules/grams; the heat of fusion being the amount of heat needed to effectively and permanently fuse the toner composition to a supporting substrate such as paper. In addition, the aforementioned copolymers generally possess a weight average molecular weight of from about 2,500 to about 1,500,000, and have a dispersity $M_w/M_n$ ratio of about 2 to about 15.

The aforementioned low melting copolymers are generally present in the toner composition in various effective amounts depending, for example, on the amount of the other components. Generally, from about 70 to about 95 percent by weight of the copolymer is present, and preferably from about 80 to about 90 percent by weight.

Numerous well known suitable pigments or dyes can be selected as the colorant for the toner including, for example, carbon black, like REGAL 330®, VULCAN ™ carbon black, and other carbon blacks available from Cabot Corporation, nigrosine dye, lamp black, iron oxides, magnetites, and mixtures thereof. The pigment, which is preferably carbon black, should be present in a sufficient amount to render the toner composition highly colored. Thus, the pigment particles can be present in amounts of from about 1 percent by weight to about 20, and preferably from between about 2 to about 10 percent by weight, based on the total weight of the toner composition, however, lesser or greater amounts of pigment particles may be selected.

Various magnetites which are comprised of a mixture of iron oxides (FeO.Fe2O3) in most situations include those commercially available, such as MAPICO BLACK ™ can be selected for incorporation into the toner compositions illustrated herein. The aforementioned magnetite particles are present in various effective amounts, generally however they are present in the toner composition in an amount of from about 10 percent by weight to about 35 percent by weight, and preferably in an amount of from about 15 percent by weight to about 19 percent by weight.

A number of different charge enhancing additives may be selected for incorporation into the toner compositions of the present invention to enable these compositions to acquire a positive charge thereon of from, for example, about 10 to about 40 microcoulombs per gram. Examples of charge enhancing additives include alkyl pyridinium halides, especially cetyl pyridinium chloride, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium methyl sulfate reference U.S. Pat. No. 4,560,635, the disclosure of which is totally incorporated herein by reference; and other similar known charge enhancing additives. These additives are usually incorporated into the toner in an amount of from between about 0.1 percent by weight to about 15 percent by weight, and preferably these additives are present in an amount of from about 0.2 percent by weight to about 5 percent by weight.

Moreover, the toner composition can have present therein as internal or external components other additives, such as colloidal silicas inclusive of AEROSIL®, metal salts of fatty acids, such as zinc stearate, metal salts, and waxy components, particularly those with a molecular weight of from about 1,000 to about 15,000, and preferably from about 1,000 to about 6,000, such as polyethylene and polypropylene, which additives are generally present in an amount of from about 0.1 to about 10 percent by weight.

The toner composition of the present invention can be prepared by a number of known methods including melt blending the low melt polymer of the present invention and pigment particles or colorants followed by mechanical attrition. Other methods include those well known in the art such as spray drying, melt dispersion, dispersion polymerization, extrusion, and suspension polymerization. In one dispersion polymerization method, a solvent dispersion of the resin particles and the pigment particles are spray dried under controlled conditions to result in the desired product. Known micronization with classification can provide toner particles wherein most of the particles have an average volume diameter of from about 5 to about 20, and preferably from about 8 to about 12 microns.

Examples of characteristics associated with the toner compositions of the present invention include a fusing temperature of less than about 260° F., and a fusing temperature latitude of from about 260° to about 375° F. Moreover, the aforementioned toners possess stable triboelectric charging values of from 10 to 30 microcoulombs per gram for an extended number of imaging cycles, exceeding, for example, in some embodiments two million developed copies. Although it is not desired to be limited by theory, it is believed that two factors for the slow, or substantially no degradation in the triboelectric charging values reside in the unique rheological properties of the low melt extrusion polymer selected, and moreover the stability of the carrier particles utilized. Also of value is the consumption of less energy with the toner compositions of the present invention since they can be fused at a lower temperature, that is about 260° F. (fuser roll set temperature) compared with other conventional toners including those containing styrene butadiene resins which fuse at from about 300° to about 330° F.

As carrier particles for enabling the formulation of developer compositions when admixed with the toner described herein, there are selected various known components including those wherein the carrier core is comprised of steel, ferrites, iron, polymers, and the like. Also useful are the carrier particles prepared by a powder coating process as illustrated in the patents mentioned herein, the disclosures of which are totally incorporated herein by reference. More specifically, these carrier particles selected can be prepared by mixing low density porous magnetic, or magnetically attractable metal core carrier particles with from, for example, between about 0.05 percent and about 3 percent by weight, based on the weight of the coated carrier particles, of a mixture of polymers until adherence thereof to the carrier core by mechanical impaction or electrostatic attraction; heating the mixture of carrier core particles and polymers to a temperature, for example, of between from about 200° F. to about 550° F. for a period of from about 10 minutes to about 60 minutes enabling the polymers to melt and fuse to the carrier core particles; cooling the coated carrier particles; and thereafter classifying the obtained carrier particles to a desired particle size.

In a specific embodiment of the present invention, there are provided carrier particles comprised of a core with a coating thereover comprised of a mixture of a first dry polymer component and a second dry polymer component. Therefore, the aforementioned carrier compositions can be comprised of known core materials including iron with a dry polymer coating mixture thereover. Subsequently, developer compositions of the present invention can be generated by admixing the aforementioned carrier particles with the toner compositions comprised of the crosslinked or heat modified resin particles and pigment particles.

Thus, a number of suitable solid core carrier materials can be selected. Characteristic carrier properties of importance include those that will enable the toner particles to acquire a positive charge, and carrier cores that will permit desirable flow properties in the developer reservoir present in the xerographic imaging apparatus. Also of value with regard to the carrier core properties are, for example, suitable magnetic characteristics that will permit magnetic brush formation in magnetic brush development processes; and also wherein the carrier cores possess desirable mechanical aging characteristics. Examples of carrier cores that can be selected include iron, steel, ferrites, magnetites, nickel, and mixtures thereof. Preferred carrier cores include ferrites and sponge iron, or steel grit with an average particle size diameter of from between about 30 microns to about 200 microns.

Illustrative examples of polymer coatings present in effective amounts, such as for example from about 0.1 to about 5 weight percent coating weight selected for the carrier particles include those that are not in close proximity in the triboelectric series. Specific examples of polymer mixtures used are polyvinylidene fluoride with polyethylene; polymethyl methacrylate and copolyethylene vinylacetate; copolyvinylidene fluoride tetrafluoroethylene and polyethylene; polymethyl methacrylate and copolyethylene vinylacetate; and polymethyl methacrylate and polyvinylidene fluoride. Other coatings, such as polyvinylidene fluorides, fluorocarbon polymers including those available as FP-461, terpolymers of styrene, methacrylate, and triethoxy silane, polymethacrylates, reference U.S. Pat. No. 3,526,534, the disclosure of which is totally incorporated herein by reference, and not specifically mentioned herein can be selected providing the objectives of the present invention are achieved.

The percentage of each polymer present in the carrier coating mixture can vary depending on the specific components selected, the coating weight and the properties desired. Generally, the coated polymer mixtures used contain from about 10 to about 90 percent of the first polymer, and from about 90 to about 10 percent by weight of the second polymer. Preferably, there are selected mixtures of polymers with from about 30 to about 60 percent by weight of the first polymer, and from about 70 to about 40 percent by weight of a second polymer. In one embodiment of the present invention, when a high triboelectric charging value is desired, that is exceeding 30 microcoulombs per gram, there is selected from about 50 percent by weight of the first polymer such as a polyvinylidene fluoride, commercially available as KYNAR 301F ®; and 50 percent by weight of a second polymer, such as polymethyl methacrylate. In contrast, when a lower triboelectric charging value is required, less than, for example, about 10 microcoulombs per gram, there is selected from about 30 percent by weight of the first polymer, and about 70 percent by weight of the second polymer. Coating weight can vary, generally the coating weight is from between about 0.1 and about 4 weight percent.

Generally, from about 1 part to about 5 parts by weight of toner particles are mixed with from about 10 to about 300 parts by weight of the carrier particles illustrated herein enabling the formation of developer compositions.

Also encompassed within the scope of the present invention are colored toner compositions comprised of toner resin particles, carrier particles, and as pigments or colorants magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, permanent yellow FGL, and the like. These pigments are generally present in the toner composition in an amount of from about 1 weight percent to about 15 weight percent based on the weight of the toner resin particles.

The toner and developer compositions of the present invention may be selected for use in electrophotographic imaging processes containing therein conventional photoreceptors, including inorganic and organic photoreceptor imaging members. Examples of imaging members are selenium, selenium alloys, and selenium or selenium alloys containing therein additives or dopants, such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines and vanadyl phthalocyanines. As charge transport molecules, there can be selected the aryl amines disclosed in the '990 patent. Also, there can be selected as photogenerating pigments squaraine compounds, thiapyrillium materials, and the like. These layered members are conventionally charged negatively thus usually a positively charged toner is selected for development. Moreover, the developer compositions of the present invention are particularly useful in electrophotographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference. Images obtained with the developer compositions of the present invention possess acceptable solids, excellent halftones and desirable line resolution with acceptable or substantially no background deposits.

The following Examples are being supplied to further define the present invention, it being noted that these Examples are intended to illustrate and not limit the scope of the present invention. Parts and percentages are by weight unless otherwise indicated.

Generally, for the preparation of xerographic toners they are initially prepared as illustrated herein. The polymer obtained with the processes of the present invention can thus be admixed with pigment particles and other additives by, for example, melt extrusion, and the resulting toner particles can be classified and jetted to enable toner particles, preferably with an average volume diameter of from about 10 to about 20 microns.

EXAMPLE I

A 79.2 weight percent polystyrene-20.8 weight percent butadiene copolymer (50 grams) comprised of 83.1 percent of 1,2-vinyl butadiene regioisomer with $T_{g\text{-}mid}$ at 52° C. and having a GPC $M_n = 6,660$ was mixed with 1 weight percent of benzoyl peroxide (0.5 gram) in a lab mill (400 milliliter coffee grinder) and was then melt mixed in a Brabender plastorecorder melt mixing apparatus at 140° C. +/− 10° C. for 20 minutes. The resultant 10 percent crosslinked resin formed by addition and combination of 1,2-butadienyl groups possessed a high molecular weight component which was greater than 1 million $M_w$, as determined by GPC. The crosslinked resin was allowed to cool, isolated by chipping the material away from the mixing apparatus using a knife, and was chopped using a coffee grinder laboratory mill. The powdered resin, (40 grams, 92 weight percent of the toner formulation) was then formulated with 6 weight percent of REGAL 330 ® carbon black and 2 weight percent of cetyl pyridium chloride using a coffee grinder. The mixture was extruded at 130° C. using a CSI mixing extruder operated at 130° C. The extrudate was chopped using a lab mill, micronized using a Trost jet mill, and then classified using a Donaldson classifier to between 9 and 15 microns as determined using Laysen cell particle analysis. The resultant toner was mixed at 3.3 weight percent with carrier of 70 weight percent of polyvinylidine fluoride and 30 weight percent of polymethyl methacrylate melt coated onto a steel core. The triboelectric charge on the toner was 21 microCoulombs per gram after a 15 minute roll up using a roll mill operated at 100 revolutions per minute. Solid area images were made using a capacitor consisting of two aluminum plates separated by 4 millimeters and charged at 1,200 volts D.C. One of the plates was taped to plain paper on which the image was developed by cascading toner-carrier (developer), over the paper until a toner mass of 1.1 milligrams per cm² was achieved. Fusing was then carried out using a Xerox Corporation 5028 silicone roll fuser operated at 3.3 inches per second. Fix level was then evaluated as a function of fuser surface temperature by using crease, gloss and tape tests as metrics. The toner had a minimum fix temperature at 260° F. as determined by crease test and a hot offset temperature at 320° F., as determined by offset of molten image onto the silicone fuser roll. No silicone release oil or agent was used. The difference between hot offset temperature (320° F.) and the minimum fix temperature (260° F.) represents a 60° F. fusing latitude. This compares with a 20° F. fusing latitude at the same minimum fix temperature when a similar toner was prepared except that there was selected the uncrosslinked resin comprised of 79.2 weight percent of polystyrene-20.8 weight percent of butadiene copolymer comprised of 83.1 percent of 1,2-vinyl butadiene regioisomer with $T_{g\text{-}mid}$ at 52° C. and having a GPC $M_n = 6,660$).

EXAMPLE II

Polystyrene-butadiene copolymers listed in Table 1 (50-grams, 92 weight percent of the toner formulation) were formulated with 6 weight percent of REGAL 330 ® carbon black and 2 weight percent of cetyl pyridium chloride. After extrusion at 130° C. using a CSI mixing extruder, the extrudate was chopped, jetted using a Trost jet mill, and classified to 9 microns. Solid area images were prepared at 1.1 to 1.3 grams per cm², and then fused using a Xerox Corporation 5028 soft silicone roll fuser operated at 3.3 inches per second. The properties of the anionic copolymers with various glass transition temperatures and molecular weights are summarized in Table 1. Fusing is dependent on $T_{g\text{-}mid}$, $M_w$, desired gloss level and required blocking temperature (>110° F.). Crease minimum fix temperature depends on $T_{g\text{-}mid}$ and weight average molecular weight. Toners with weight average molecular weights near 33,000 have gloss and crease minimum fix temperatures which are nearly the same. Fusing latitudes as measured by gloss and crease are dependent on weight average molecular weight. Highest gloss fusing latitude was achieved near 17,000 $M_w$. Highest crease fusing latitudes were achieved at 60,000 $M_w$. Gloss and crease fusing latitudes intersected at 32,000 $M_w$. Thus, anionic toners with the same crease and gloss fusing latitude (of 25° C.) are made with 32,000 $M_w$ copolymer. Copolymers with $M_n$ near 20,000 jet at 45 grams per minute, whereas higher molecular weight materials jet more slowly than conventional toners like styrene, 13 weight percent butadiene suspension copolymer with $M_w/M_n = 120,000/18,000$, which jets between 10 and 15 grams per minute under the same jetting conditions. Small toner dimensions are best achieved with materials having $M_n$ less than 20,000. The advantage to melt mixing these materials with peroxides at 130° C. is to effectively increase $M_w$ and to decrease $M_n$. Toner jetting rates increase with decreased $M_n$. Thus the crosslinked materials jetted faster to smaller particle dimensions at faster jetting rates, but fusing latitude increased because $M_w$ increased. The fusing latitudes increase from between 25° C. at 32,000 to about 35° C. at 60,000 $M_w$.

The above copolymers (50 grams) were melt mixed with 1 weight percent of benzoyl peroxide at 130° C. for 20 minutes in accordance with Example I and toners were then made with the crosslinked copolymers by extrusion at 130° C. with 6 weight percent of Regal 330 and 2 weight percent of cetyl pyridinium chloride. Toners were then prepared my micronization of the extrudate followed by classification to 10 microns using a Donaldson classifier. Fusing of toner images was carried out using a Xerox Corporation 5028 silicone roll fuser operated at 3.3 inches per second as before. The fusing latitudes of the toners prepared with the crosslinked resins were enhanced by 15°+/−5° C. compared with those of toners prepared with the starting uncrosslinked resins under the same processing and testing conditions.

EXAMPLE III

Preparation of Lithium/Naphthalene Catalyst

To a 1-liter, one-neck flask were added naphthalene (45 grams) and lithium shot (5.1 grams) in mineral oil. The flask was equipped with a magnetic stir bar, and was then capped with a rubber septum. After an argon purge, freshly distilled tetrahydrofuran (300 milliliters) was then added by cannula under argon and the mixture was stirred for 16 hours. The molarity of this initiator solution was 2.38 molar as determined by an average of the GPC molecular weight results from six polymerization reactions.

Preparation of Styrene-Butadiene Copolymer with Lithium/Naphthalene Catalyst A 1-liter beverage bottle was equipped with a stir bar and rubber septum. After an argon purge, tetrahydrofuran (300 milliliters, 262.7 grams) and cyclohexane (350 milliliters, 268.1 grams) were added by cannula under argon. Lithium/naphthalene initiator solution (approximately 0.5 milliliter) was added dropwise until the solution was light yellow-green. More 2.38 molar lithium/naphthalene solution (11 milliliters) was then added by syringe. After cooling the beverage bottle reactor in a dry ice/2-propanol bath at −30° C., styrene (100 milliliters, 91.6 grams) and butadiene (43 milliliters, 29.1 grams) combined were added over 5 minutes under argon. After 16 hours at 25° C., 2-propanol (5 milliliters) was added to the red reaction solution, which immediately became colorless. The reaction mixture was added to 2-propanol (4,000 milliliters) using a Waring blender to precipitate the polymer. The coagulated polymer was isolated by filtration, washed with methanol (1,000 milliliters), and vacuum dried to yield 118 grams of copolymer (97.9 percent theoretical yield). The resultant white polymer was comprised of 77.52 weight percent of styrene and 22.48 weight percent of butadiene with 78.1 percent of the butadiene content as the 1,2-vinyl regioisomer, as determined using $^1$H NMR spectrometry. The monomodal GPC $M_w/M_n$ was 26,162/18,499, and the glass transition temperature was 50.3° C. as determined by differential scanning calorimetry. The copolymer product was made into toner by extrusion at 130° C. with 6 weight percent of REGAL 330® carbon black and 2 weight percent of cetyl pyridium chloride charge control agent followed by micronization. The MFT of the resulting toner was 124° C. and the HOT was 146° C. using a Xerox Corporation 5028 silicone roll fuser operated at 3.3 inches per second. The properties of this material are compared with similar materials in Table 1. A summary of reagents used to prepare other related styrene-butadiene copolymers with GPC·$M_n$ values between 2,500 and 18,500 is listed in Table 2.

Developer Compositions

Developer compositions were prepared by admixing 3.3 parts by weight of the toner composition of Example I with 97.5 parts by weight of a carrier comprised of a steel core with a polymer mixture thereover containing 70 percent by weight of KYNAR ®, a polyvinylidene fluoride, and 30 percent by weight of polymethyl methacrylate; the coating weight being about 0.9 percent. The triboelectric charging value of the toner as determined in the Faraday Cage for the toner was 20 microcoulombs per gram.

Positively charged toners were prepared by repeating the above procedure with the exception that there was included therein 2 percent by weight of the charge enhancing additive cetyl pyridinium chloride.

Images were then developed with a xerographic imaging test fixture similar to the Xerox Corporation 5090 with a negatively charged layered imaging member comprised of a supporting substrate of aluminum, a photogenerating layer of trigonal selenium, and a charge transport layer of the aryl amine N,N'-diphenyl-N,N'-bis(3-methylphenyl) 1,1'-biphenyl-4,4'-diamine, reference U.S. Pat. No. 4,265,990, the disclosure of which is totally incorporated herein by reference; and there resulted images of excellent quality with substantially no background deposits and of high resolution for an extended number of imaging cycles exceeding 100,000.

Toner Blocking Tests

Toners made in accordance with Examples I and II were heated in an oven at various temperatures until the powders were no longer free flowing. Toners made with copolymers with $T_{g\text{-}mid}$ values less than 51.5° C. failed the blocking test between 110° and 115° F. because of agglomeration of the toner particles.

Hot Roll Rusing Evaluations

Roll fusing evaluations were carried out with a Xerox 5028 soft roll silicone fuser in the absence of silicone oil release agent. Fuser set temperature was determined using an Omega pyrometer. Fuser roll speed was approximately 3.3 inches per second. Minimum fix temperature was determined by gloss, crease, and tape tests. The crease test was accomplished as follows: a solid area image at 1.1 to 1.3 grams of toner per cm$^2$ of paper was folded 180 degrees with the image side inward. When unfolded, the crease area was observed (as 65 visually) and compared to Xerox Corporation 1075 imaging apparatus fix standards.

The tape test was accomplished by placing SCOTCH ™ brand Magic 810 (¾ inch) tape on the solid area of the fused toner image and the tape was then removed. The amount of toner retained by the tape (without paper fibers) was minimal as determined by visual observation.

Hot offset temperature was determined when fused toner images offset, or transferred from paper onto the fuser roll and then reprinted onto the same paper or onto subsequent sheets of paper. Two known indications that offset occurred include printing on the fuser roll and ghost image areas on the final copy paper after transfer.

Toner image gloss was measured with fusing temperature using a VWR 75 degree gloss meter. Fusing temperature comparisons were rendered between the toners prepared in accordance with Examples I and II and the toners, Xerox Corporation 1075 and 5090, at the same gloss value of about 10.

In embodiments, the present invention is directed to a process for the preparation of crosslinked styrene-1,2-butadiene copolymers which comprises reacting by heating in an extruder a low molecular weight styrene-1,2-butadiene copolymer with a $M_n$ between 2,500 and 45,000 and a crosslinking component; thereafter cooling and isolating the product; a process for the preparation of low melting crosslinked styrene-1,2-butadiene copolymers with a $T_{g\text{-}mid}$ between 26° and 60° C. which comprises reacting in an extruder a low molecular weight styrene-butadiene copolymer with $M_n$ between 2,500 and 45,000 and a crosslinking peroxide component by heating at a temperature of from between about 100° and 200° C.; thereafter cooling and isolating the product; and a process wherein the melt mixing apparatus is a rubber roll mill, a Banbury mixer, a Brabender plastigraph mixer, or a Haake melt mixer, and the processing temperature for crosslinking is between 10020 and 200° C.

Other modifications of the present invention may occur to those skilled in the art subsequent to a review of the present application, and these modifications are intended to be included within the scope of the present invention.

TABLE 1

Physical Properties of Anionic Styrene-Butadiene Copolymers

| $T_g/T_f$ °C. | Wt. % Bd Attempted | Wt. % Bd | % 1,2-Vinyl | GPC $M_w$ | $M_n$ | $M_n$ Attempted | $M_{Peak}$ | $M_z$ | $M_{z+1}$ | Disp. |
|---|---|---|---|---|---|---|---|---|---|---|
| 52.5/50.6 | 22.98 | 16.58 | 75.43 | 4,764 | 2,543 | 3,000 | 4,153 | 6,766 | 8,967 | 1.87 |
| 48.7/47.1 | 24.33 | 20.16 | 80.90 | 5,825 | 3,690 | 5,000 | 5,601 | 7,913 | 10,374 | 1.58 |
| 51.5/49.7 | 24.56 | 20.77 | 83.07 | 8,730 | 6,657 | 9,000 | 9,237 | 10,883 | 13,081 | 1.31 |
| 48.1/46.9 | 24.66 | 22.48 | 78.84 | 12,107 | 7,973 | 10,000 | 14,399 | 16,174 | 20,005 | 1.52 |
| 50.1/48.6 | 25.19 | 23.24 | 84.41 | 15,344 | 10,875 | 15,000 | 17,679 | 18,805 | 21,848 | 1.41 |
| 50.3/49.0 | 24.11 | 22.48 | 78.10 | 26,162 | 18,499 | 20,000 | 27,121 | 33,270 | 41,558 | 1.41 |
| 52.9/51.5 | 24.59 | 22.24 | 87.32 | 32,503 | 16,142 | 20,000 | 33,435 | 50,156 | 67,365 | 2.01 |
| 53.7/52.5 | 24.20 | 22.10 | 89.8 | 49,919 | 35,850 | 40,000 | 62,460 | 61,400 | 71,490 | 1.39 |
| 52.9/51.5 | 24.14 | 22.99 | 84.5 | 62,140 | 44,090 | 45,000 | 74,470 | 77,270 | 90,810 | 1.41 |
| 52.7/51.2 | 23.67 | 22.11 | 81.6 | 94,200 | 71,150 | 70,000 | 104,900 | 114,800 | 135,300 | 1.32 |
| 54.3/51.7 | 24.66 | 23.32 | 90.0 | 95,300 | 72,050 | 70,000 | 107,200 | 114,000 | 130,900 | 1.32 |
| 54.3/50.7 | 24.04 | 22.81 | 87.3 | 111,900 | 81,720 | 80,000 | 128,900 | 136,700 | 160,000 | 1.37 |

TABLE 2

Reagents Used to Prepare Anionic Styrene-Butadiene Copolymers

| Styrene Gram | Butadiene Gram | Cyclohexane Gram | THF Gram | Li/Naphth. Initiator mL | Addition Time Minutes | GPC $M_n$ |
|---|---|---|---|---|---|---|
| 90.9 | 18.06 | 269.1 | 262.5 | 84 | 5 | 2,543 |
| 91.4 | 23.08 | 269.5 | 262.3 | 50 | 5 | 3,690 |
| 89.2 | 25.87 | 268.1 | 261.3 | 26 | 5 | 7,973 |
| 90.5 | 27.40 | 269.0 | 262.7 | 17 | 5 | 10,875 |
| 91.6 | 26.56 | 268.1 | 262.7 | 11 | 5 | 18,499 |
| 91.1 | 26.06 | 0 | 568.7 | 11 | 5 | 16,142 |

What is claimed is:

1. A process for the preparation of toner compositions wherein there are prepared styrene-1,2-butadiene copolymers by heating in an extruder a low melting crosslinked styrene-1,2-butadiene copolymer with a $T_{g\text{-}mid}$ between 26° and 60° C., an $M_n$ between 2,500 and 45,000, and a crosslinking peroxide component, which heating is accomplished at a temperature from between about 100° and about 200° C.; thereafter cooling and isolating the product; and subsequently extruding or melt mixing said product with pigment, colorant, and optional charge control agent; thereafter micronizing in a jet mill and classifying to form toner particles with an average diameter of from between about 10 to about 25 microns.

2. A process in accordance with claim 1 wherein the crosslinked copolymer has a $T_{g\text{-}mid}$ of from about 26° C. to about 60° C.

3. A process in accordance with claim 1 wherein the soluble polymer product has a number average molecular weight of from about 2,500 to about 1,500,000 as determined by GPC analysis.

4. A process in accordance with claim 1 wherein the dispersity ratio of the polymer component $M_w/M_n$ is from about 2 to about 15.

5. A process in accordance with claim 1 wherein product polymer contains between about 60 and 85 weight percent of styrene and between 16 and 40 weight percent of butadiene with between 5 and 100 percent of the butadiene content comprised of the 1,2-vinyl regioisomer.

6. A process in accordance with claim 1 wherein the pigment particles are selected from the group consisting of carbon black, magnetites, and mixtures thereof.

7. A process in accordance with claim 1 wherein the pigment particles are selected from the group consisting of cyan, magenta, yellow, and mixtures thereof.

8. A process in accordance with claim 1 wherein the charge enhancing additive is selected from the group consisting of alkyl pyridinium halides, organic sulfates, organic sulfonates, and distearyl dimethyl ammonium methyl sulfate.

9. A process in accordance with claim 1 wherein the toner has a fusing temperature of about 260° F.

10. A process for the preparation of toner compositions which consists essentially of (1) mixing in an extruder powdered anionic styrene-butadiene copolymer with from between about 0.1 and about 10 weight percent of benzoyl peroxide; (2) heating the resulting peroxide-copolymer mixture for from between about 1 and 30 minutes at 130° C.; (3) allowing the molten mass to cool; (4) removing the polymeric solid formed from the extruder; (5) chopping the crosslinked polymer; (6) mixing the resulting powder with pigment particles and charge control agents; (7) extruding the resulting mixture at 130° C.; (8) chopping the extrudate; (9) jetting the chopped extrudate; and (10) classifying the resultant toner particles.

11. A process in accordance with claim 1 wherein there is added hexafluoroacetone during crosslinking.

12. A process in accordance with claim 10 wherein there is added hexafluoroacetone during crosslinking.

13. A process in accordance with claim 1 wherein the crosslinked polymer has a nonblocking temperature of less than about 50° C. and the toners resulting can be fused at temperatures of about 260° F.

14. A process in accordance with claim 8 wherein the charge additive is cetyl pyridinium chloride.

15. A process for the preparation of a developer composition which comprises mixing the toner of claim 1 with carrier particles.

* * * * *